United States Patent [19]

Kraus

[11] 4,235,404
[45] Nov. 25, 1980

[54] CABLE STRAP

[75] Inventor: Willibald Kraus, Kaiserslautern, Fed. Rep. of Germany

[73] Assignee: TRW Inc., Cleveland, Ohio

[21] Appl. No.: 24,765

[22] Filed: Mar. 29, 1979

[30] Foreign Application Priority Data

Mar. 29, 1978 [DE] Fed. Rep. of Germany ....... 2813484

[51] Int. Cl.³ .............................................. F16L 3/08
[52] U.S. Cl. .............................. 248/74 PB; 24/16 PB; 248/73
[58] Field of Search ................. 24/16 PB; 248/74 PB, 248/73

[56] References Cited

U.S. PATENT DOCUMENTS

| 3,471,109 | 10/1969 | Meyer | 248/74 PB X |
| 3,486,200 | 12/1969 | Orenick | 24/16 PB |
| 3,667,710 | 6/1972 | Moody et al. | 248/74 PB X |
| 3,930,287 | 1/1976 | Grise et al. | 24/16 PB |

Primary Examiner—J. Franklin Foss
Attorney, Agent, or Firm—James R. O'Connor

[57] ABSTRACT

A cable strap for tying a bundle of cables comprising a flexible encircling element which is adapted to wrap the cables and which has engaging means thereon, retaining means having a locking element which is adapted to inter-engage with the engaging means on the encircling element and an extensible section between the encircling element and the retaining means which is resiliently extensible in the direction of the length of the encircling element. The engaging means on the encircling element is detachably inter-engageable with the locking element so that the encircling element can be wrapped around a bundle of cables and then temporarily locked in position by inter-engagement of the engaging means with the locking element.

14 Claims, 8 Drawing Figures

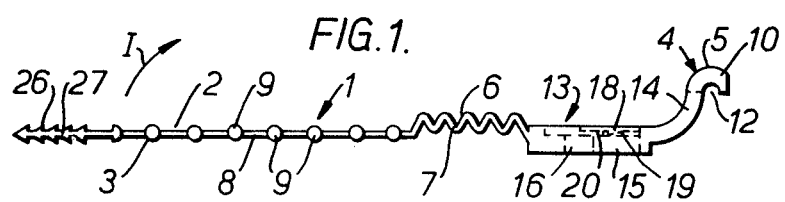
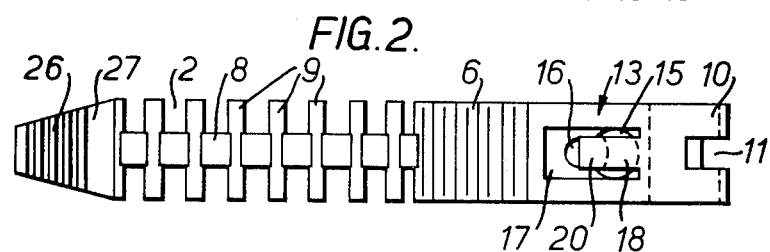
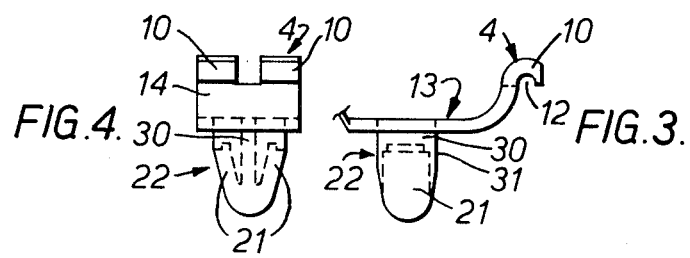
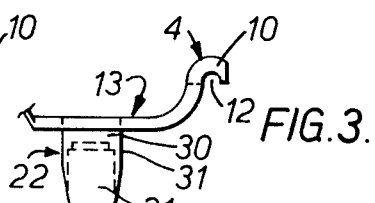
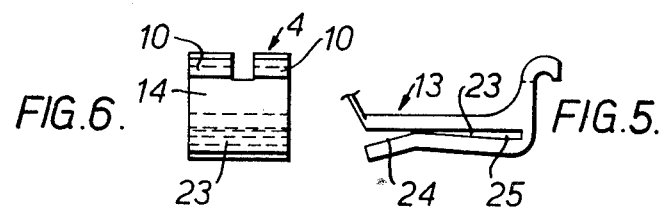
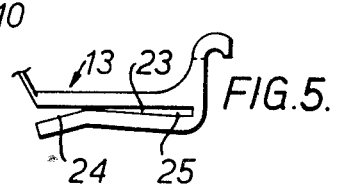

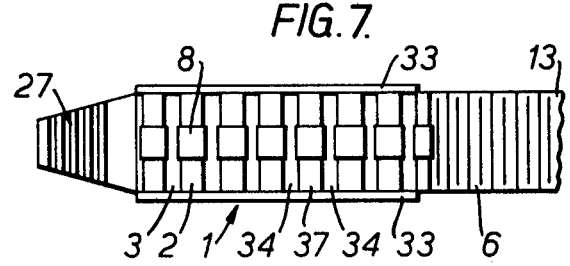
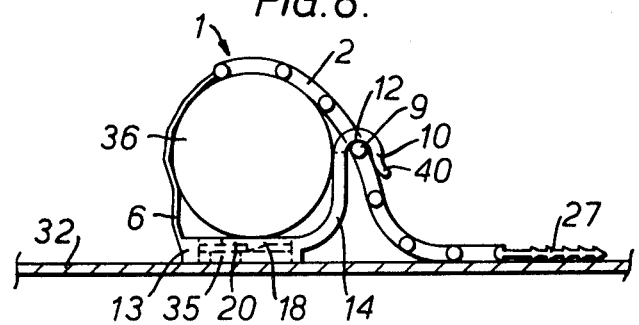

CABLE STRAP

BACKGROUND OF THE INVENTION

1. Field of the Invention

The invention relates to a cable strap comprising a tie-shaped encircling element having engagement elements and retaining means with a locking element for co-operation with the engagement elements.

2. Description of the Prior Art

A cable strap is already known, in which the tie-shaped encircling element has rectangular recesses which form the engagement elements. The retaining means is provided with a rectangular aperture and a tongue serving as a locking means, the tongue engaging resiliently in one of the rectangular recesses in the encircling means and making a connection between the engagement element and locking means. It is a disadvantage of this known type of cable strap that the encircling element cannot be removed from the retaining means without destroying the cable strap. Therefore, this type of cable strap cannot be used, for example, when an additional cable has to be added to a bundle. In these circumstances a new cable strap is required. Another disadvantage of this known type of cable strap is that it does not provide for any tolerance in the cable diameters so that it has only a limited range of application.

SUMMARY OF THE INVENTION

It is an object of the present invention to provide a cable strap that has a wider range of application and which can be disassembled in all cases without damage.

According to the present invention, there is provided a cable strap comprising a flexible encircling element having engaging means thereon, retaining means having a locking element adapted to inter-engage with the engaging means and an extensible section between the encircling element and the retaining means, the engaging means being detachably inter-engageable with the locking element.

The cable strap of the present invention has the advantages that the extensible section ensures adjustment to accommodate different cable diameters, and the detachable inter-engagement between the engagement means and the locking element enables additional cables to be fitted at any time.

Preferably, the extensible section has an undulating or corrugated shape which allows for extension in the direction of the length of the encircling element. As a result of this undulating shape, the length of the cable strap can be varied when the cable strap is made of plastics material so that different cable diameters can be fully encircled. The range of application of the cable strap of the invention is therefore considerably widened thereby.

In another embodiment of the invention the engagement means comprises cross pieces extending at right angles to the length of the encircling element, spaced at intervals from one another and connected by a central strip, the locking element being hook-shaped and having a central recess. The cross pieces may therefore be advantageously hooked into the locking element, the central strip being accommodated in the central recess. The central recess can be equal in width to the central strip so that a good locking action is achieved when the central strip is accommodated in the central recess and the cross pieces are engaged in the locking element.

In another feature of the invention the hook-shaped locking element can be disposed above the encircling element, and provided with downwardly directed catches or stops which interengage with the cross pieces. Disassembly is thereby advantageously simplified so that the cable strap can be disassembled for the addition of further cables. In spite of the good locking action between the engagement means and the locking element, the engagement means may be easily detached.

In another feature of the invention, a mounting section is provided between the locking element and the extensible section for attaching the cable strap to a support. This mounting section advantageously enables the cable tie to be attached to a support of any shape or form.

In another embodiment of the invention the locking element can be connected to the mounting section by a curved neck portion so that there is no interference with assembly or disassembly of the cable strap when the cable tie is mounted on a support.

If the cable strap of the invention is attached to a T-stud, the mounting section can comprise a slot of smaller dimensions connected to an aperture, a rectangular recess surrounding the aperture being provided on the upper side of the mounting section. A locking tongue may be provided, projecting into the rectangular recess and partially overlapping the aperture and the slot. The locking tongue may comprise a downwardly directed, inclined contact surface and a flat locking area. A T-stud can be inserted into the aperture and moved into the slot, the upper side of the T-stud engaging the flat locking section after passing across the inclined contact area so as to be secured in the slot.

If the cable strap of the invention is secured in a bore, the mounting section can comprise a downwardly directed stud provided with fastening elements, which is simply pressed into the hole and locked therein.

The stud may comprise two fastening elements located opposite one another with an intermediate web, the fastening elements being surrounded by a membrane extending up to the mounting section. This thin, flexible plastic membrane acts as a seal so that a perfect sealing effect is obtained when the stud is pressed into a hole.

It is possible for the mounting section to be provided with a U-shaped recess parallel to the encircling element and comprising an inclined run-in section and a clamping section so that the cable tie can be fitted on an edge of a sheet metal component.

In order to facilitate handling during assembly or disassembly of the cable strap a grooved gripping tab can be provided adjacent to the encircling element.

BRIEF DESCRIPTION OF THE DRAWINGS

The invention will be described in more detail below with the aid of embodiments illustrated in the drawings, in which:

FIG. 1 is a side view of a cable strap according to the invention;

FIG. 2 is a plan view of the cable strap shown in FIG. 1;

FIG. 3 is a side view, of a part of another embodiment of a cable strap according to the invention;

FIG. 4 is an end view of the cable strap shown in FIG. 3;

FIG. 5 is a side view of a part of another embodiment of a cable strap according to the invention;

FIG. 6 is an end view of the cable strap shown in FIG. 5;

FIG. 7 is a plan view of a part of another embodiment of a cable strap according to the invention;

FIG. 8 is a side view partially in section of the cable strap shown in FIGS. 1 and 2 attaching a cable to a panel.

DESCRIPTION OF PREFERRED AND ALTERNATIVE EMBODIMENTS

The cable strap 1 illustrated in FIG. 1 comprises a tie-shaped encircling element 2, a retaining element 4 and a gripping tab 27. An extensible, length compensating section 6 and a support or mounting section 13 are provided between the encircling element 2 and the retaining element 4.

The encircling element 2 comprises a number of cross pieces 9 spaced from one another and connected by a central strip 8. The cross pieces 9 form projections on opposite sides of the strip 8 which act as engaging means 3. The cross pieces 9 are chamfered or rounded to prevent injury. The encircling element 2 is adjacent to the extensible section 6 which has an undulatory form 7 extending at right angles to the longitudinal direction.

The extensible section 6 leads into the mounting section 13. In the embodiment illustrated in FIGS. 1 and 2 the mounting section 13 has an aperture 15 and a slot 16 of smaller diameter communicating with the aperture.

On the upper side of the mounting section the aperture 15 and slot 16 lead into a rectangular shaped recess 17, as shown in FIG. 2. Projecting into the recess 17 is a locking tongue 16 which, in the vicinity of the aperture 15, has an inclined contact surface 19 and, in the vicinity of the slot 16, a flat locking section 20.

The cable strap 1 is intended to receive a T-stud, the upper side of the T-stud being engaged by the inclined contact surface after its insertion into the aperture 15 thereby moving the cable strap relative to the T-stud so that the T-stud passes into the slot 16 and is locked in this position by the flat locking section 20. This interengagement of the mounting section 13 and the T-stud is illustrated in FIG. 8. In this connection the underside of the mounting section 13 may have a recess to allow space for a welded stud.

The mounting section 13 leads into the retaining element 4 via a curved neck 14. The retaining element 4 is provided with a locking element 5 having hook-shaped engaging sections 10 as shown in FIGS. 1 and 2. As shown in FIG. 2, the engaging sections 10 are separated by a central recess 11. The width of this central recess 11 is equal to the width of the central strip 8.

As shown in FIG. 1, the hook-shaped engaging section 10 comprises two downwardly opening catches 12, the curvature of which corresponds with the diameter of the cross pieces of the encircling element 2, which act as engaging means 3.

The gripping tab 27 has grooves 26 and is provided adjacent the encircling element 2. The mounting section 13, having the aperture 15, slot 16 and locking tongue 18, enables the cable strap 1 to be attached to a T-stud. Cables can then be received by the cable strap, the cable strap being wound around the cable or the bundle of cables in the direction of arrow I in FIG. 2 until the cables are encircled. The cross piece is then engaged in the catch 12 of the locking element 5. A cable strap fitted in this manner can be seen in FIG. 8 from which it will be seen that the cable 36 is encircled by the cable strap 1 in a functionally reliable manner.

Disassembly is simply achieved by removing the locked cross piece 9 from the catch 12 by pulling on the gripping tab 27. The encircling element 2 is thereby released and can be unwound from the cables. As a result of the undulatory or corrugated form 7 of the length-adjustable extensible section 6 extending at right angles to the longitudinal direction, the cable strap provides substantial tolerances in the different cable diameters which can be fastened and achieves a secure support of the cables in all cases.

In the embodiment shown in FIGS. 3 and 4 the mounting section 13 comprises a stud 22 provided with locking elements 21 lying opposite one another. The locking elements 21 are connected to the mounting section 13 by an intermediate web 30 and are enclosed by a thin, flexible membrane 31, thereby achieving a seal around the hole in addition to a secure fastening. The stud 22 is pressed into a hole in a support, which is not shown, so that a secure fastening of the cable strap 1 to the support and a good seal are ensured by the locking elements 21.

In the embodiment shown in FIGS. 5 and 6 the mounting section 13 is provided with a U-shaped recess 23 extending parallel to the encircling element 2 and comprising an inclined run-in section 24 and a clamping section 25. The inclined run-in section 24 ensures easy insertion of the cable strap on to an edge of a sheet metal panel whereafter the clamping section ensures secure mounting of the cable tie on the panel.

In the embodiment illustrated in FIG. 7, the engaging means 3 comprise cross pieces 34 which extend at right angles to the longitudinal direction of the cable tie, are spaced at intervals from one another and are connected by a central strip 8 and outer strips 33. A very stable construction is advantageously formed as a result, the removal forces being considerably improved as a result of the enclosed shape. The gripping tab 27 and extensible section 6, which leads into the mounting section, are in turn provided adjacent to the encircling element 2. In this embodiment the catches 12 of the retaining means 4 engage in recesses 37 which are defined by two adjacent cross pieces 34, the central strip 8 and the outer strip 33.

A cable strap 1 is illustrated in FIG. 8. In this case a T-stud 35 is welded to a support 32. The cable strap 1 is attached to the T-stud 35 by the mounting section 13, the locking tongue 18 and the flat locking section 20 ensuring trouble-free mounting. A cable 36 is now inserted, whereupon the cable strap as shown in FIG. 1 is pivoted in the direction of arrow I and wrapped around the cable 36. A cross piece 9 engages the catches 12 of the hook-shaped engaging means 10, whereupon the fastening operation is completed. The gripping tab 27 lies flat on the support 32 so that there are no obstructing parts. In this embodiment the hook-shaped engaging means 10 comprises a projecting tongue 40, thereby facilitating assembly or disassembly of the cable 36 from the strap 1.

The cable strap 1 is made of plastics material, is easy to manufacture and has a wide range of applications as a result of its special features. Equally easy assembly and disassembly are advantageously possible, so that the cable strap according to the invention can be used repeatedly.

Thus, it is to be clearly understood that the foregoing description of a preferred embodiment is to be interpreted only in an illustrative sense and that the scope of the invention is to be determined with reference to the claims which follow:

I claim:

1. A cable strap comprising a flexible encircling element having engaging means thereon, said engaging means including cross pieces extending at right angles to the length of the encircling element, spaced at intervals from one another and connected by a central strip, retaining means having a locking element adapted to interengage with the engaging means, said locking element being hook-shaped and being formed with a central recess, said engaging means being detachably interengageable with the locking element, and an extensible section between the encircling element and the retaining means.

2. A cable strap as claimed in claim 1 wherein the extensible section has an undulating shape which is extensible in the direction of the length of the encircling element.

3. A cable strap as claimed in claim 1 wherein the width of the central recess is equal to the width of the central strip.

4. A cable strap as claimed in claim 1 wherein the hook-shaped locking element is positioned above the tie-shaped encircling element and formed with downwardly directed catches adapted to inter-engage with the cross pieces.

5. A cable strap as claimed in claim 1 wherein a mounting section is provided between the locking element and the extensible section for fastening the cable strap to a support.

6. A cable strap as claimed in claim 5 wherein the locking element is connected to the mounting section by a curved neck portion.

7. A cable strap as claimed in claim 5 wherein the mounting section is formed with a slot of smaller dimensions connected to an aperture, and a rectangular recess is provided on the upper side of the support section around the aperture.

8. A cable strap as claimed in claim 7 wherein a locking tongue partially overlaps the aperture and the slot projects into the rectangular recess, the locking tongue having a downwardly directed inclined surface and a flat locking section.

9. A cable strap as claimed in claim 5 wherein the mounting section includes a stud having fastening elements.

10. A cable strap as claimed in claim 9 wherein the fastening elements on the stud are situated opposite one another and connected to the mounting section by an intermediate web.

11. A cable strap as claimed in claim 10 wherein the web and the fastening elements on the stud are surrounded by a membrane which extends up to the mounting section.

12. A cable strap as claimed in claim 5 wherein the mounting section is formed with a U-shaped recess extending parallel to the encircling element and including an inclined run-in surface and a clamping section.

13. A cable strap as claimed in claim 1 wherein a grooved gripping tab is provided adjacent to the encircling element.

14. A cable strap as claim in claim 1 wherein the cross pieces of said engaging means are also connected by outer strips.

* * * * *